BIDIRECTIONAL MOTOR CONTROL CIRCUIT

Filed Sept. 22, 1960

INVENTOR.
James F. Merritt
BY Eugene M. Whitacre
Attorney 3,144,598

BIDIRECTIONAL MOTOR CONTROL CIRCUIT

James F. Merritt, Palmyra, N.J., assignor to Radio Corporation of America, a corporation of Delaware Filed Sept. 22, 1960, Ser. No. 57,770
6 Claims. (Cl. 318—293)

This invention relates generally to wireless remote control systems, and more particularly to a remote control receiver for regulating, in a desired manner, the operation of a device coupled thereto.

Various types of wireless remote control systems have been proposed heretofore wherein a local transmitter is caused to emit radio or sound control signals having predetermined frequency or modulation characteristics for reception by a remotely located receiver. The characteristics of the received control signals are utilized by the receiver to effect a selective mode of operation of an electroresponsive utilization device connected thereto. Systems of this type have been widely used to regulate the operation of remotely located radio or television receivers thereby enabling the listener or viewer to adjust the tuning, volume, tone, etc. without physically moving to the receiver location.

It has been found desirable in remote control systems of this type to provide for bidirectional adjustment of the device whose operation is to be controlled. For example, the ability to effect rotation of a tuner driver motor in either direction to a desired channel is preferable to the mere ability to effect unidirectional rotation of the drive motor until the desired channel is reached. To provide a bidirectional control, remote control receivers have been heretofore devised utilizing relays actuable in response to a received control signal to apply a current of either polarity to the drive motor thereby to effect rotation thereof in either direction. However, the use of relays in remote control receivers of this type requires relatively complicated associated circuitry, thereby tending to increase the overall cost of the remote control system. In addition, reliable relay operation was found to be somewhat dependent upon reception of control signals above a predetermined intensity.

Accordingly, it is an object of the present invention to provide an improved wireless remote control system.

Another object of the instant invention is to provide an improved remote control system providing for regulation of the bidirectional operation of a controlled apparatus.

Another object of this invention is to provide an improved electronic control circuit employing semiconductor devices and enabling reliable and accurate regulation of the operation of a controlled electroresponsive device.

A further object of the invention is to provide an improved electronic control receiver employing low power semiconductor elements in a relatively inexpensive and uncomplicated circuit configuration.

A still further object of the instant invention is to provide an improved remote control circuit responsive to A.C. control signals, or D.C. control signals, or both.

Another still further object of the invention is to provide an improved electronic remote control having a high degree of sensitivity.

In accordance with the invention, a control circuit including apparatus to be controlled connected in series with a source of A.C. energizing potential and a pair of parallel transistors of opposite conductivity types. The D.C. bias paths between the base and emitter electrodes of the transistors are connected to normally maintain both transistors cut-off. In response to a control signal of one polarity, one of the transistors becomes conductive thereby permitting unidirectional current flow during alternate half cycles of the applied A.C. energizing potential. In response to a control signal of an opposite polarity, the other one of the transistors becomes conductive to conduct current from the A.C. source during half cycles of opposite polarity to those which produced conduction in the first transistor. Thus, control of the direction of current flow through the controlled apparatus is obtained in response to control signals of an opposite polarity.

The novel features which are considered to be characteristic of this invention are set forth with particularity in the appended claims. The invention itself, however, both as to its organization and method of operation will best be understood from the following description when read in connection with the accompanying drawing, in which:

Figures 1, 2:
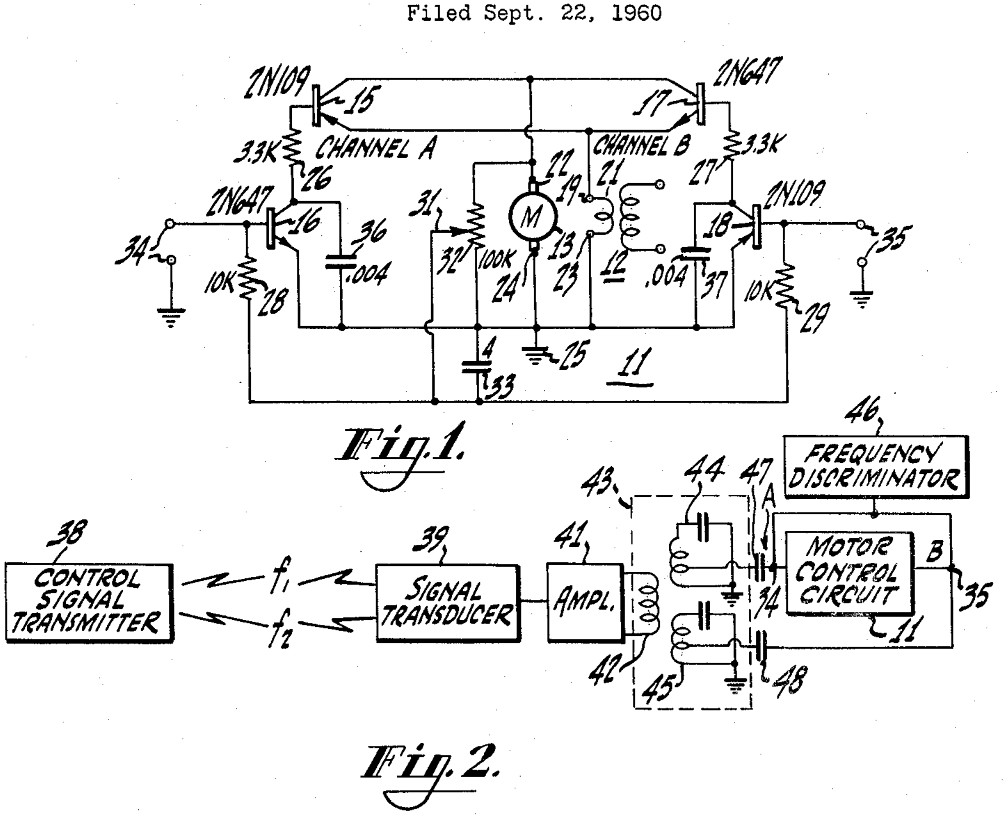
FIGURE 1 is a schematic circuit diagram of a bidirectional control circuit according to one embodiment of the present invention.
FIGURE 2 is an illustration of a remote control system utilizing the bidirectional control circuit of FIGURE 1.

In the drawings, like reference numerals designate identical or corresponding parts throughout the several views. Referring more particularly to FIGURE 1, a bidirectional control circuit 11 according to one embodiment of the present invention is shown as composed of a pair of substantially identical signal translating circuits designated as channels A and B respectively, arranged in parallel between an alternating current potential energy source, such as a 6.3 volts A.C. (alternating current) filament transformer 12 and a relatively small D.-C. (direct current) motor 13, such as a 600 milliwatt (mw.) motor, the operation of which is to be bidirectionally controlled. Channel A of the motor control circuit includes two semiconductor active circuit elements such as transistors 15 and 16 of opposite conductivity types. For illustrative purposes, transistor 15 is assumed to be of the PNP type and transistor 16 of the NPN type. Channel B similarly includes two transistors 17 and 18 of opposite conductivity types. For the assumed transistor types of channel B, transistor 17 is of the NPN type and transistor 18 of the PNP type.

The emitter and collector electrodes of the opposite conductivity type transistors 15 and 17 are connected together; the emitter electrodes being connected through a terminal 19 to one side of secondary winding 21 of transformer 12. The collector electrodes are connected together, and through a terminal 22 to one side of the armature circuit of motor 13. Transistors 15 and 17 function as switches regulating the application of the driving current from source 12 through the emitter-collector electrode path of the transistors 15 and 17 to the motor 13, while transistors 16 and 18 function as control devices for alternatively closing the transistor switches in the motor control circuit. The other sides of the transformer secondary winding 21 and the motor armature circuit are connected through terminals 23 and 24, respectively, to a point of fixed reference potential, such as ground 25. The base electrode of transistor 15 is connected through a current limiting resistor 26 to the collector electrode of transistor 16. Similarly, a current limiting resistor 27 interconnects the base electrode of transistor 17 and the collector electrode of transistor 18.

The emitter electrodes of transistors 16 and 18 are both connected to ground 25. A direct current path between the base and emitter electrodes of transistors 16 and 18 is provided through resistors 28 and 29, respectively, through the wiper arm 31 of a potentiometer 32, thence through part of the resistance of the resistor of potentiometer 32 to ground 25 and the emitters of the transistors 16 and 18. The resistor of potentiometer 32 is connected across load terminals 22–24. A bypass capacitor 33 is connected between movable contact 31 and ground 25. Control signal input terminals 34 and 35 are provided between ground 25 and the base electrodes of transistors 16 and 18, respectively. In the absence of a positive polarity signal at input terminals 34, no forward bias exists between the base and emitter electrodes of transistor 16, hence the transistor is normally cut-off. Similarly, in the absence of a negative polarity signal at input terminals 35, no forward bias exists between the base and emitter electrodes of transistor 18 and this transistor is also normally cut-off.

In operation, upon the application of the A.C. energizing signal from A.C. source 12, to the emitters of transistors 15 and 17, no appreciable current flows in the circuit because negative half cycles reverse bias the PNP transistor 15, and positive half cycles reverse bias the NPN transistor 17. On the alternate half cycles of the A.C. energizing signal when the emitter of transistor 15 could be forward biased by a positive half cycle from source 12, the normally cut-off condition of transistor 16 effectively interrupts the D.C. conductive path between the emitter and base electrodes of transistor 15, and hence, no forward bias is developed on transistor 15. In like manner, when the emitter of transistor 17 could be forward biased by a negative half cycle from source 12, the normally cut-off condition of transistor 18 effectively interrupts the D.C. conductive path between the emitter-base electrodes of transistor 17 thereby effectively interrupting the D.C. conductive path between the emitter and base electrodes of transistor 17 and no forward bias is developed for transistor 17. Hence, no current flows through the collector-emitter electrodes of either of transistors 15 and 17 and the motor 13 regardless of the polarity of the A.C. supply signal since the forward bias D.C. conductive paths of transistors 15 and 17 in both channels are effectively open circuited and non-responsive thereto, and the motor remains motionless.

If however, a D.C. control signal of positive polarity and of a magnitude, for example, of 150 millivolts is applied to input terminals 34 a suitable forward bias will be developed across resistor 28 for the base-emitter junction of transistor 16, thereby rendering this transistor conductive. Upon transistor 16 being rendered conductive, the D.C. conductive path between the emitter-base electrodes of transistor 15 is rendered continuous through resistor 26, the collector-to-emitter electrode path of transistor 16, ground 25, and secondary winding 21. Hence, during the positive half cycles of the A.C. signals from source 12 transistor 15 is suitably forward biased and a pulsating positive D.C. current will be conducted through the collector-emitter electrode path thereof from source 12 to the motor 13 causing it to rotate in one direction. Similarly, the application of a negative polarity D.C. control signal to input terminals 35 of a magnitude, for example, of 150 millivolts, results in the development of a suitable forward bias across resistor 29 for the emitter-base electrodes of transistor 18 thereby providing a continuous direct current path including resistor 27, collector-to-emitter electrodes of transistor 18, ground 25, and secondary winding 21 for the emitter-base electrodes of transistor 17. During the negative half cycles of the A.C. signal from source 12 transistor 17 is suitably forward biased and will conduct a pulsating D.C. current through the emitter-collector electrodes thereof in response to negative half cycles of the A.C. signal, thereby causing the motor 13 to rotate in the opposite direction.

Bidirectional motor drive control operation is also realizable by the application of A.C. control signals to input terminals 34 and 35 of the same magnitude as the D.C. control signals. During the positive half cycle of the applied A.C. control signal, a suitable forward bias is developed across the emitter-base electrodes of transistor 16 again rendering this transistor conductive and thereby providing a direct current path for the development of a suitable forward bias during one half cycle of the energizing signal for the emitter-base electrodes of transistor 15 to conduct pulsating positive D.C. potential through the emitter-collector electrodes thereof to drive motor 13 in one direction. During the negative half cycle of the applied A.C. control signal, transistor 18 is suitably forward biased and rendered conductive thereby translating the negative polarity portion of the energizing signal through the collector-emitter electrodes thereof to drive motor 13 in the opposite direction of rotation. Where A.C. control signals are to be employed, capacitors 36 and 37 are preferably connected across the collector-emitter electrodes of transistors 16 and 18, respectively, to provide filtering of the applied A.C. control signal thereby to maintain a suitable D.C. bias across the collector-emitter electrodes.

In order to protect the low power transistor devices utilized in motor control circuit 11 from injury, or even destruction, due to heat dissipation, it is desirable that the transistors be fully conductive when in operation, i.e., full saturation with high current flow but no collector-to-emitter voltage. To insure this condition in the presence of relatively weak control signals on input terminals 34 and 35, the wiper 31 is selectively positioned on potentiometer 32 to provide a suitable magnitude of regenerative unidirectional feedback voltage of the correct polarity to increase the forward bias on transistors 16 and 18 thereby rendering these transistors more conductive. This, in turn, will increase the forward bias on transistors 15 and 17 thereby rendering these transistors also more conductive. Capacitor 33 is of a suitable size to bypass the A.C. control signals applied to terminals 34 and 35 to ground thereby preventing any deleterious effect on the feedback by the applied control signals. The regenerative feedback provided by potentiometer 32 also serves to increase the sensitivity of the motor control circuit 11 by providing for suitable circuit operation in the presence of relatively weak control signals.

The utilization of the bidirectional motor control circuit 11 of FIGURE 1 in a remote control television, or radio receiver system wherein the motor 13 functions as the receiver's tuner, tone, or volume control drive motor is illustrated in FIGURE 2. In this application a remote transmitter 38 radiates an ultrasonic wave of either of two frequencies $f_1$ or $f_2$. Let it be assumed that a signal of frequency $f_1$ is transmitted to effect motor operation in one direction and a signal of frequency $f_2$ is transmitted to effect motor operation in the opposite direction. The control wave is picked-up by a suitable transducer 39, such as an electrostatic microphone, which produces a corresponding electrical signal. The transduced electrical control signal is amplified by an amplifier 41 and is then applied to the primary winding 42 of a transformer 43 coupling the amplifier 41 to the motor control circuit 11. The coupling transformer 43 includes two resonant secondary networks 44 and 45 each of which is tuned to be selectively responsive to one of the transmitted ultrasonic frequencies. For descriptive purposes, let it be assumed that tuned network 44 is tuned to frequency $f_1$ and is connected to input terminals 34 of channel A of the motor control circuit 11, while tuned network 45 is tuned to frequency $f_2$ and is connected to input terminals 35 of channel B thereof. Thus, if rotation of motor 13 is desired in one direction, transmitter 38 is operated to transmit a control signal of frequency $f_1$ and channel A of the motor control circuit 11 will effect the desired direction of motor rotation. If, in turn, motor rotation in the opposite direction is desired, a control signal of frequency $f_2$ is transmitted by transmitter 38 which renders channel B of the motor control circuit operative to effect the desired direction of motor rotation. Rotation of the motor 13 will continue for as long as a control signal is present on either of terminals 34 or 35. Thus, remote bidirectional control of motor operation is provided by the system of FIGURE 2.

Since, as disclosed hereinbefore, bidirectional control of motor operation can be obtained from the application of both A.C. or D.C. control signals to input terminals 34 and 35, dual control of motor operation can be readily obtained by the use of A.C. control signals from an external source, such as the transmitter 38, and a D.C. control signal from an internal source of a television or radio receiver, such as a frequency discriminator 46. Since a drift in the frequency of an input signal from the center frequency to which the discriminator is tuned produces a D.C. output signal of a ploarity indicative of the direction of drift, application of a D.C. control signal derived from the receiver's frequency discriminator 46 to channels A and B will provide for continuous automatic frequency control of the receiver. It is to be understood that the common source of D.C. control signals in this situation has no adverse effects on the operation of the control circuit 11 since the application of a negative polarity control signal to terminals 34 provides a reverse bias across the emitter-base electrodes of normally cut-off transistor 16, thereby maintaining this condition, and the application of a positive polarity control signal to terminals 35 provides a reverse bias for normally cut-off transistor 18 which maintains this operational condition. In this combination control application, blocking capacitors 47 and 48 are preferably provided to keep the D.C. control signal from the coupling circuit 43. Thus, it is seen that only one of the signal translating channels is made operative in response to D.C. control signals derived from a common source, such as discriminator 46, and effective bidirectional control of motor operation is provided.

Figure 3:
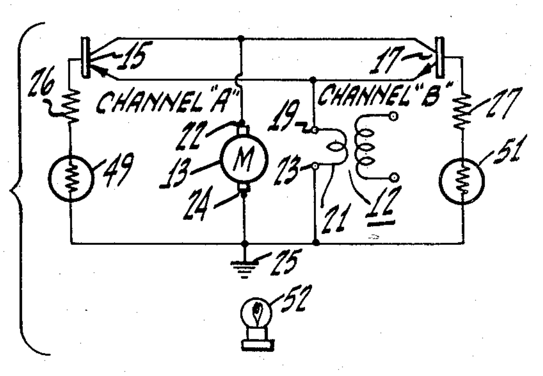
FIGURE 3 is a schematic circuit diagram of a bidirectional control circuit according to another embodiment of the present invention; and, FIGURE 4 is a schematic circuit diagram of a bidirectional control circuit according to a further embodiment of the present invention.
Figure 4:
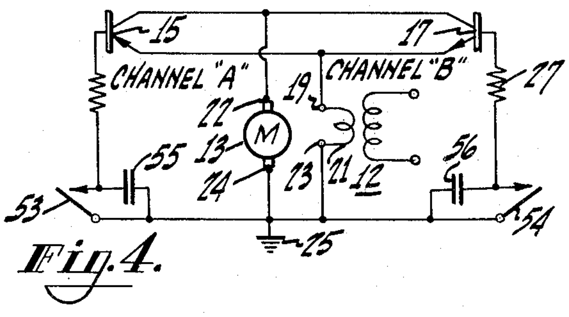

Examples of alternative embodiments of a remote bidirectional motor control system in accordance with the instant invention are shown in FIGURES 3 and 4. Referring to FIGURE 3, it will be noted that two identical signal translating channels are again included in the motor control circuit but that photo conductive or other radiant energy responsive resistance devices 49 and 51 have been substituted for the control transistors 16 and 18 and their associated circuitry. In this embodiment, the base-emitter bias path of transistors 15 and 17 are maintained interrupted by the extremely high impedances of the devices 49 and 51, respectively in the absence of light, or other similar radiant, energy impinging thereon. When, however, a beam from a light source 52 is directed on to either of the photo conductive resistance devices, the resistance thereof to a forward bias current flow derived during one half cycle of the energizing potential provided by source 12 is considerably diminished and current flow to motor 13 from source 12 will be affected by the collector-emitter electrodes of the associated one of transistors 15 or 17. Thus, remote bidirectional control of motor 13 is obtained.

In the embodiment shown in FIGURE 4, vibrating reeds 53 and 54 are substituted in the signal translating channels for control transistors 16 and 18, respectively, and their associated circuitry. The vibrating reeds are made responsive to diverse acoustic frequencies. In this embodiment the contacts of the vibrating reeds are normally maintained open thereby rendering the base-emitter bias paths of transistors 15 and 17 discontinuous. In response to an acoustic control signal of the resonant frequency of either of the vibrating reeds, the contacts thereof will be intermittently closed and the D.C. bias path for the base-emitter of the associated transistor completed whereupon energizing current flow through the collector-emitter electrodes of either of transistors 15 and 17 to the motor 13 results. Capacitors 55 and 56 are connected across the contacts of vibrating reed devices 53 and 54, respectively, to provide suitable filtering of the current flow through the contacts in order that a D.C. base current flow can be provided for the associated transistor switch.

According to the teachings of this invention, an improved control circuit has been described which provides for bidirectional control of a small motor, or other similar electroresponsive device, with less amount of circuitry than prior control circuitry of this type. The control circuit also provides reliable and accurate operation in response to relatively small D.C. and/or A.C. control signals and can also provide continuous or intermittent control.

What is claimed is:

1. A control circuit comprising a pair of output terminals, a first pair of semiconductor devices of opposite conductivity types and having their respective emitter electrodes and collector electrodes commonly connected, said commonly connected collector electrodes being connected to one of said pair of output terminals, an A.C. energizing potential source connected between said commonly connected emitter electrodes and the other one of said pair of output terminals, a second pair of semiconductor devices of opposite conductivity types individually connected in the conductive path between the base electrode of each of said first pair of semiconductor devices and said other one of said pair of output terminals, each of said second pair of devices being normally cutoff for preventing the development of a forward bias between the base-emitter electrodes of the respective first device by the energizing potential thereby preventing energizing potential flow through the emitter-collector electrodes of the respective device, each of said second pair of devices being rendered conductive in response to a control signal of a unique polarity applied thereto to permit the development in the respective conductive path of a forward bias for the base-emitter electrodes of the respective first device during one-half cycle of said energizing potential thereby enabling the flow of said energizing potential through the emitter-collector electrodes of the said respective first device during said one-half cycle, feedback circuit means coupled between said pair of output terminals and said second pair of semiconductor devices, said feedback circuit means providing a feedback signal to said second pair of semiconductor devices of a polarity which drives a conductive one of said second pair of semiconductor devices in the more conductive direction and drives the other of said second pair of semiconductor devices in the less conductive direction.

2. A control circuit comprising:

a load impedance element;

a pair of semiconductor devices of opposite conductivity types and having their respective emitter electrodes and collector electrodes commonly connected;

an alternating current energizing potential source connected in series with said load impedance element between said commonly connected emitter electrodes and said commonly connected collector electrodes;

a first direct current conductive path connected between the base and emitter electrodes of one of said pair of devices, a normally cut-off first semiconductor device of a type opposite of that of said one of said pair of devices having its emitter and collector electrodes in said first path for preventing the development of a forward bias across the base-emitter electrodes of said one of said pair of devices;

a second direct current conductive path connected between the base and emitter electrodes of the other of said pair of devices, a normally cut-off second semiconductor device of a type opposite to that of said other one of said pair of devices having its emitter and collector electrodes in said second path for preventing the development of a forward bias across the base-emitter electrodes of said other one of said pair of devices;

means for applying control signals across the base and emitter electrodes of said first and second semiconductor devices, said first device being rendered conductive in response to a control signal of one polarity to develop a forward bias across the base-emitter electrodes of said one of said pair of devices thereby enabling the passage of current through the emitter-collector electrodes of said one of said pair of devices in said one direction, said second device being rendered conductive in response to a control signal of the opposite polarity to develop a forward bias across the base-emitter electrodes of said other one of said pair of devices thereby enabling the passage of current through the emitter-collector electrodes of said other one of said pair of devices in the opposite direction;

feedback circuit means coupled to the emitter-collector current paths of said pair of transistors for developing a feedback voltage, and means for applying said feedback voltage between the base and emitter electrodes of said first and second semiconductor devices, said feedback voltage being of a polarity to drive a conductive one of said pair of semiconductor devices in the more conductive direction and to drive a nonconductive one of said pair of semiconductor devices in the less conductive direction.

3. A control circuit comprising:

an electric motor, a pair of transistors of opposite conductivity types having their respective emitter electrodes and collector electrodes commonly connected;

an alternating current potential source connected in series with said motor between said commonly connected emitter electrodes and said commonly connected collector electrodes;

a first direct current conductive path connected between the base and emitter electrodes of one of said pair of transistors including a normally cut-off first transistor of a type opposite to that of said one of said pair of transistors, said first transistor having its emitter and collector electrodes in said first path for maintaining said one of said pair of transistors cut-off;

a second direct current conductive path connected between the base and emitter electrodes of the other one of said pair of transistors including a normally cut-off second transistor of a type opposite to that of said other one of said pair of transistors, said second transistor having its emitter and collector electrodes in said second path for maintaining said other one of said other pair of transistors cut-off;

means for applying a control signal across the base and emitter electrodes of said first and second transistors, said first transistor being rendered conductive in response to a control signal of one polarity to forward bias the base-emitter electrodes of said one of said pair of transistors thereby enabling the conduction of current between the emitter-collector electrodes of said one of said pair of transistors in one direction, said second transistor being rendered conductive in response to a control signal of the opposite polarity to forward bias the base-emitter electrodes of said other one of said pair of transistors thereby enabling the conduction of current between emitter-collector electrodes of said other one of said pair of transistors in the opposite direction, feedback circuit means including a potentiometer connected in parallel with said motor, and means coupling said potentiometer to the base electrodes of said first and second transistors.

4. A control circuit as defined in claim 3 including first and second filter capacitors connected respectively between the collector and emitter electrodes of said first and second transistors.

5. An electrical control circuit comprising:

a load impedance element;

an alternating current source;

a pair of transistors of opposite conductivity type and having their respective emitter electrodes and collector electrodes commonly connected;

means connecting said commonly connected emitters and said commonly connected collectors in series with said load impedance element and said alternating current source;

control circuit means connecting the base and emitter paths of said transistors, said control circuit means operable to provide polarized control signals to selectively render one of said transistors conductive to control the direction of current through said load impedance element; and feedback circuit means coupling the emitter to collector current paths of said transistors in common with the said control circuit means to provide regenerative feedback to a conductive one of said transistors and degenerative feedback to a nonconductive one of said transistors.

6. A control circuit comprising:

a motor;

an alternating current source;

a pair of transistors of opposite conductivity type having their respective emitter electrodes and collector electrodes commonly connected;

means connecting said commonly connected emitters and commonly connected collectors in series with said motor and said alternating current source;

control circuit means connecting the base and emitter paths of said transistors, said control circuit means operable to provide polarized control signals to selectively render one of said transistors conductive to control the direction of current through said motor; and feedback circuit means coupling the emitter to collector current paths of said transistors with the said control circuit means to provide regenerative feedback to a conductive one of said transistors and degenerative feedback to a nonconductive one of said transistors.

References Cited in the file of this patent

UNITED STATES PATENTS

| | | |
|---|---|---|
| 1,930,029 | Alden | Oct. 10, 1933 |
| 2,863,123 | Koch | Dec. 2, 1958 |
| 2,900,215 | Schoen | Aug. 18, 1959 |
| 2,938,174 | Bulleyment | May 24, 1960 |
| 2,986,648 | Willems et al. | May 30, 1961 |
| 3,084,265 | Cleland | Apr. 2, 1963 |